(12) United States Patent
Hattori

(10) Patent No.: US 6,320,720 B1
(45) Date of Patent: Nov. 20, 2001

(54) HEAD-POSITIONING SYSTEM WITH AN IMPROVED FINE TRACKING ACTUATOR CONTROL SCHEME

(75) Inventor: Toshiro Hattori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/199,794

(22) Filed: Nov. 25, 1998

(30) Foreign Application Priority Data

Nov. 28, 1997 (JP) .................................................... 9-328809

(51) Int. Cl.⁷ .............................. G11B 5/55; G11B 5/596
(52) U.S. Cl. ...................................... 360/78.05; 360/77.04
(58) Field of Search .................... 360/78.05, 75, 360/77.04

(56) References Cited

U.S. PATENT DOCUMENTS

| | | | |
|---|---|---|---|
| 3,924,268 | * 12/1975 | McIntosh et al. | 360/78.05 |
| 5,177,652 | * 1/1993 | Yamaguchi et al. | 360/78.05 |
| 5,452,275 | * 9/1995 | Ogawa | 360/78.05 X |
| 6,005,742 | * 12/1999 | Cunningham et al. | 360/78.05 |
| 6,034,834 | * 3/2000 | Yoshikawa et al. | 360/78.05 X |
| 6,088,187 | * 7/2000 | Takaishi | 360/78.05 |

FOREIGN PATENT DOCUMENTS 5-11854   1/1993 (JP).
5-174517  7/1993 (JP).

* cited by examiner

Primary Examiner—W. R. Young
Assistant Examiner—James L Habermehl
(74) Attorney, Agent, or Firm—McGuireWoods LLP

(57) ABSTRACT

To provide head-positioning system which can control tracking movement of the magnetic head reliably and smoothly with a high speed, enlarging the controllable frequency band of a fine tracking actuator by suppressing interference between the fine tracking actuator and a main actuator (27), a head-position control circuit of the head-positioning system comprises: a phase compensating controller (31) for obtaining deviation information of the read/write head relative to a designated position from the positional information (S12) detected by the read/write head, and generating a positioning correcting signal (S31) for feedback-controlling the fine tracking actuator to drive the slider supporting spring (22) with a torque value to make the read/write head follow the designated position, according to the deviation information (S12); and a vibration suppressing controller (32) for forward-controlling the main actuator to maintain an angular position of carriages (25) to be fixed by controlling the main actuator (27) to generate the same torque value with the torque value to be generated by the fine tracking actuator, referring to the positioning correcting signal (S31).

4 Claims, 5 Drawing Sheets

HEAD-POSITIONING SYSTEM WITH AN IMPROVED FINE TRACKING ACTUATOR CONTROL SCHEME

BACKGROUND OF THE INVENTION

The present invention relates to a head-positioning system of a magnetic disk device, and particularly to that to be applied in a magnetic disk device provided with a fine-tracking actuator.

Conventionally, a combination of springs and carriages connected to a main actuator have been used for head-positioning of a magnetic disk device.

The controllable frequency band of head-positioning mechanism of this type is mainly defined by the oscillation frequency of a vibration mode of the head-positioning mechanism itself, and by suppressing the oscillation of the vibration mode making use of a notch filter, for example, a controllable frequency band of 600 to 700 Hz is attained.

Along with advancement of magnetic disks of high track density, however, further enlargement of the controllable frequency band is now earnestly required, and a two-stage actuator has been studied for replying to this requirement. In the two-stage actuator, a fine-tracking actuator is provided for each head besides the main actuator, which can move the head only a little but has a high-frequency vibration mode enabling to move the head in a wide frequency band.

However, the two-stage actuator has a problem that the fine-tracking actuator interferes with the main actuator and reaction of high-speed movement of the fine-tracking actuator may provoke the oscillation of the main actuator, and hence, the controllable frequency band of the fine-tracking actuator is also limited by the vibration mode of the main actuator.

For dealing with this problem, several proposals have been disclosed. In a Japanese patent application laid open as a Provisional Publication No. 11854/'93, a relative position of a tracking actuator to a linear motor of an optical head is detected, and the tracking actuator is feedback-controlled with a differential value of the relative position for suppressing auto-oscillation because of mutual interference.

In another Japanese patent application laid open as a Provisional Publication No. 174517/'93, a magnetic disk device having hybrid-servomechanism is disclosed, wherein tracking control is performed according to both a positional error signal detected by a reading head from a data recording surface and a positional error signal detected by a servo-head reading a servo-pattern recorded on a servo-pattern recording surface of the magnetic disk.

However, the first prior art of the Provisional Publication No. 11854/'93 needs a special detector for detecting relative position of the tracking actuator to the linear motor, which makes the mechanism complicated and a product cost thereof high because of increased numbers of parts, and the second prior art of the Provisional Publication No. 174517/'93 requires at least one servo-pattern recording surface, which degrades the data-formatting efficiency, especially of a slim-type magnetic disk device having but a few numbers of magnetic disks.

SUMMARY OF THE INVENTION

Therefore, a primary object of the present invention is to resolve the above problem with a simple configuration and to provide a head-positioning system which can control tracking movement of the magnetic head reliably and smoothly with a high speed, enlarging the controllable frequency band of the fine tracking actuator by suppressing interference between the fine tracking actuator and the main actuator.

In order to achieve the object, in a head-positioning system of the invention including a head-position control circuit and a head-positioning mechanism comprising a slider supporting spring for supporting a slider holding a read/write head, a carriage fixed to a carriage supporting shaft for rotating the slider supporting spring which is set rotatably to the carriage, a fine tracking actuator for driving the slider supporting spring in a rotational direction relative to the carriage, and a main actuator for rotating the carriage supporting shaft around a center axis of the carriage supporting shaft; the head-position control circuit comprises:

a phase compensating controller for obtaining deviation information of the read/write head relative to a designated position from the positional information detected by the read/write head, and generating a positioning correcting signal for feedback-controlling the fine tracking actuator to drive the slider supporting spring with a torque value to make the read/write head follow the designated position, according to the deviation information;

a vibration suppressing controller for forward-controlling the main actuator to maintain an angular position of the carriage to be fixed by controlling the main actuator to generate the same torque value with the torque value to be generated by the fine tracking actuator, referring to the positioning correcting signal;

an outside-disturbance suppressing controller for generating an outside-disturbance suppressing signal to compensate affect of outside disturbance impressed to the main actuator, by referring to an outside disturbance table wherein appropriate control values of the main actuator are registered for each cylinder number of a magnetic disk medium whereto the read/write head faces; and a compensation signal generator for generating a compensation signal to be supplied to the main actuator by integrating outputs of the vibration suppressing controller and the outside-disturbance suppressing controller.

Therefore, a fine and high-speed tracking control of the read/write head can be realized making use of the fine tracking actuator, accurately and stably, by providing the vibration suppressing controller and the outside-disturbance suppressing controller.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
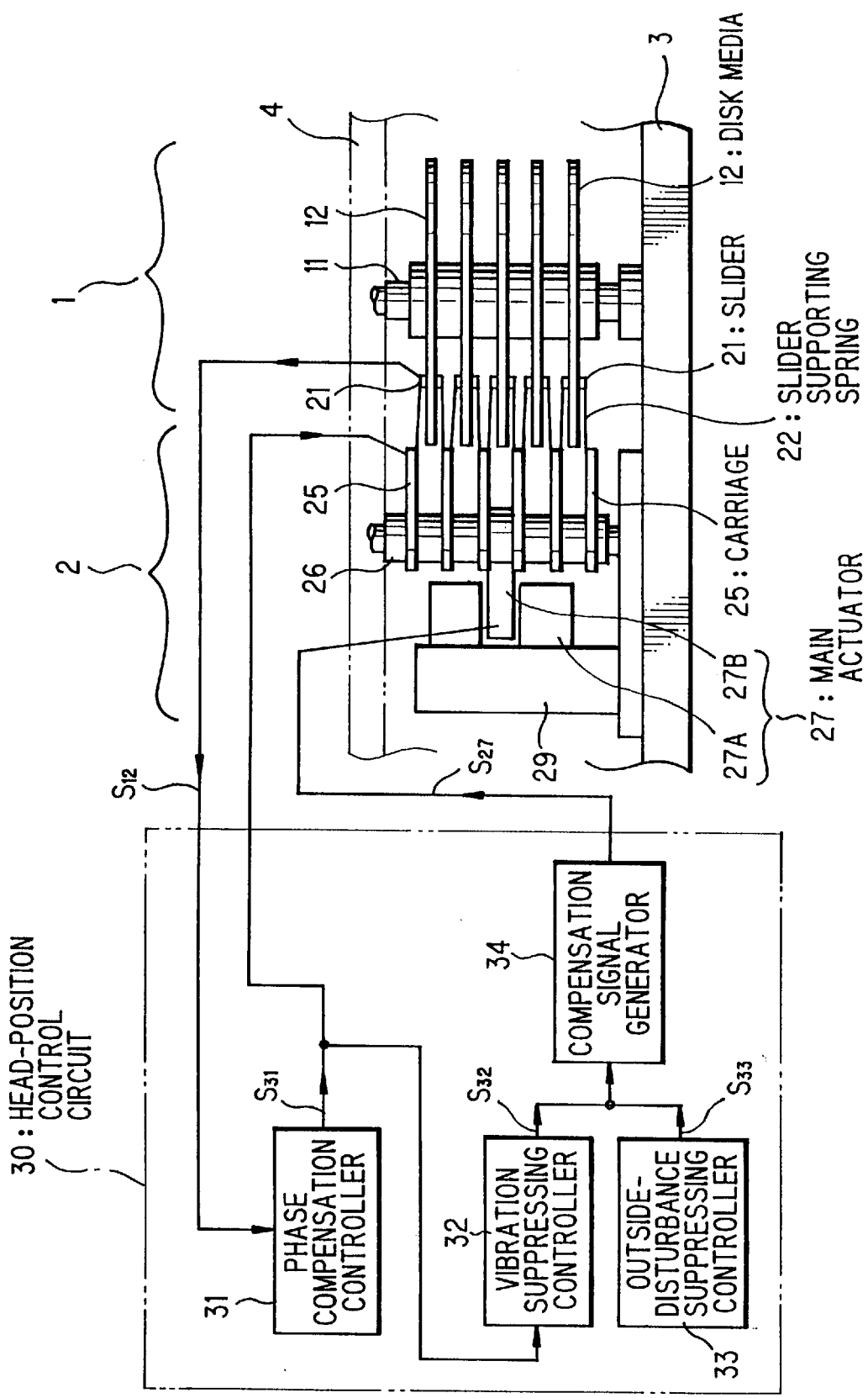
FIG. 1 is a schematic diagram illustrating a head-positioning system according to an embodiment of the invention.

FIG. 1 is a schematic diagram illustrating a head-positioning system according to an embodiment of the invention.

In FIG. 1, there are illustrated a disk assemble 1 and a head-positioning mechanism 2 mounted between a lower housing 3 and an upper housing 4. The disk assemble 1 has a spindle 11 which is set rotatably to the housing and at least one disk medium 12 fixed to the spindle 11. In the example of FIG. 1, five disk media are set in parallel with the same intervals. The spindle 11 and the disk media 12 are driven together at a high speed by a spindle motor (not depicted in the drawings).

The head-positioning mechanism 2 comprises a carriage rotating shaft 26, a plurality of carriages 25 fixed to the carriage rotating shaft 26, a plurality of slider supporting springs 22 each connected to one of the carriages 25, sliders 21 each fixed at a top of each of the slider supporting springs 22, respectively, a main actuator 27 including a stator part 27A and a rotor part 27B for rotating the carriage rotating shaft so that the sliders 22 can be positioned anywhere along with radial direction of the disk media 12, and a fixed pole 29 whereto the stator part 27A of the main actuator 27 is mounted.

Figure 2:
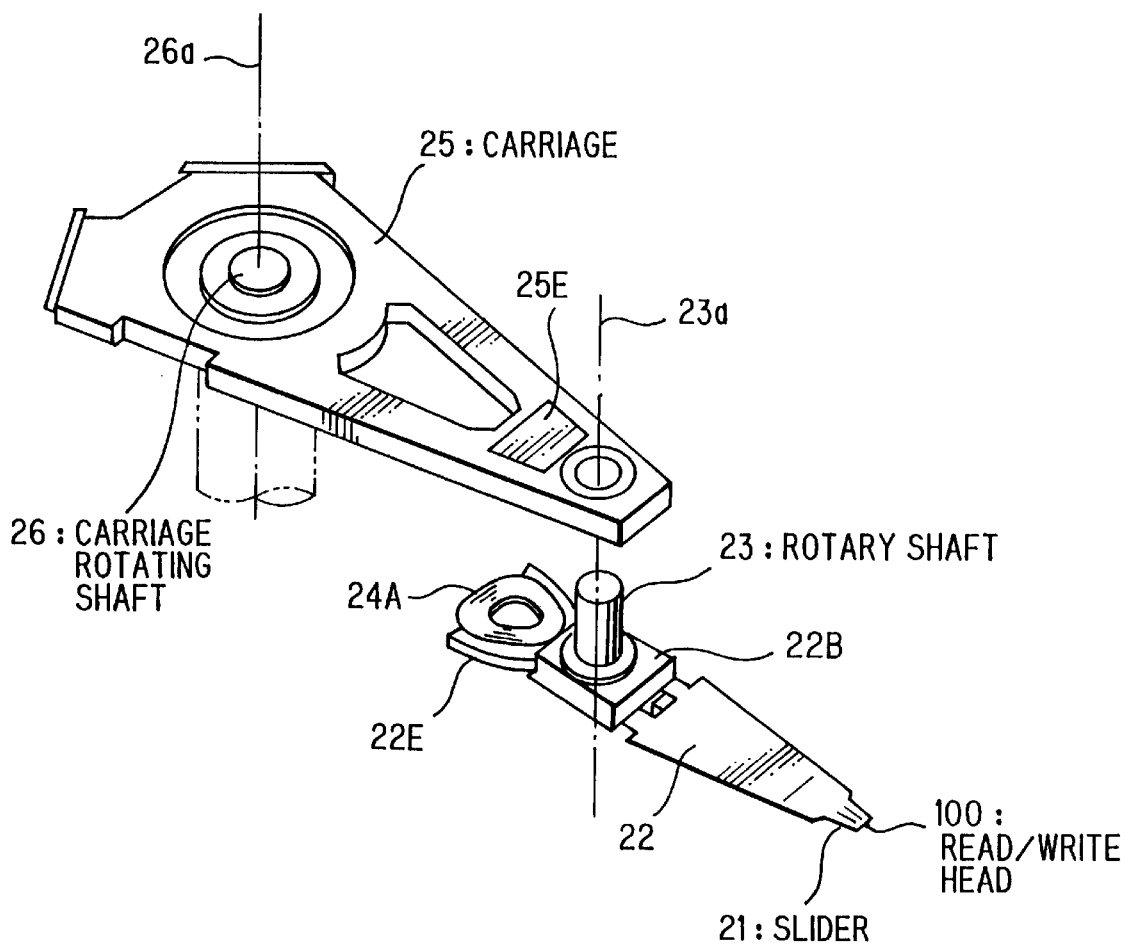
FIG. 2 is a perspective view illustrating partial configuration of the head-positioning mechanism around one of the carriages 25 of FIG. 1.
Figure 3:
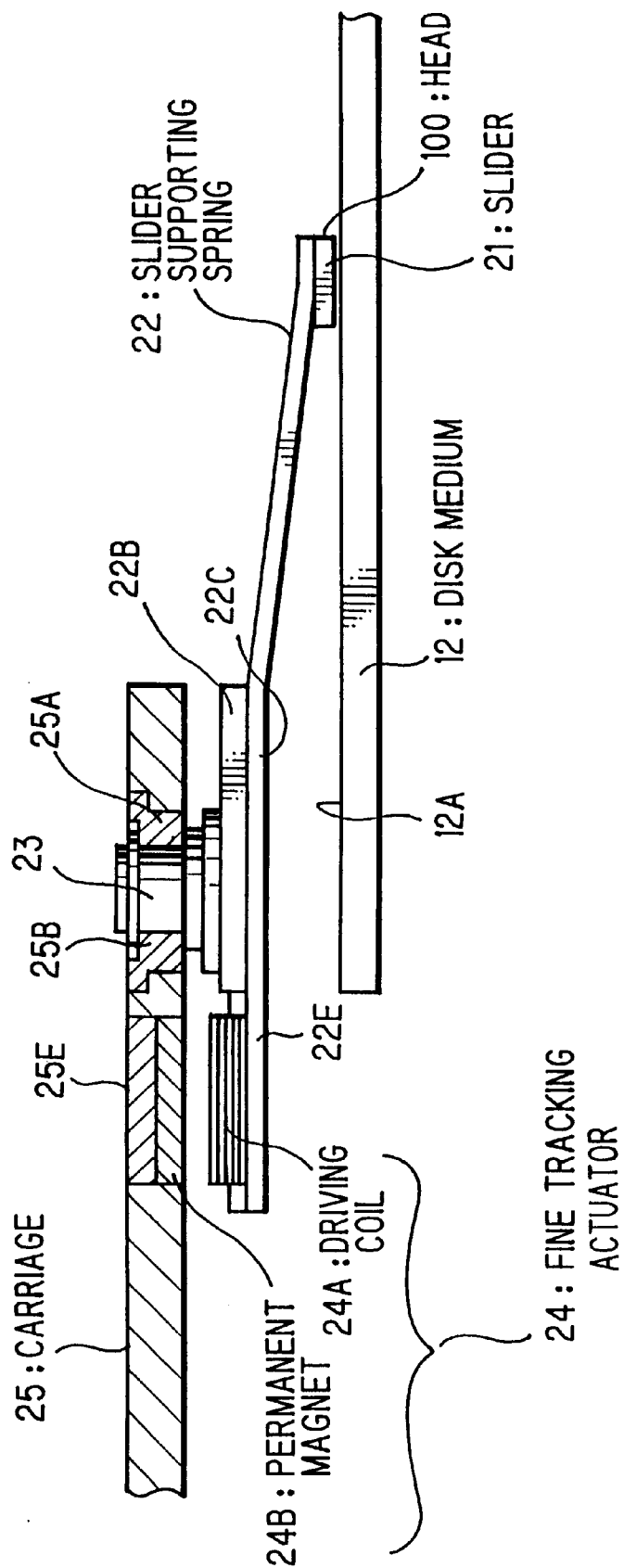
FIG. 3 is a sectional view illustrating the partial configuration of the head-positioning mechanism around the carriages 25 of FIG. 1.

FIG. 2 is a perspective view and FIG. 3 is a sectional view, both illustrating partial configuration of the head-positioning mechanism around one of the carriages 25 of FIG. 1.

Referring to FIGS. 2 and 3, a fine tracking actuator 24 is provided for each slider spring 22. A rotary shaft 23 is supported rotatably by a bearing member 25A provided at a top part of a carriage 25, and a slider supporting spring 22 is fixed to the rotary shaft 23. A slider 21 holding a read/write head 100 is mounted at a top of the slider supporting spring so as to face to an information recording surface 12A of a disk medium 12.

In the example of FIGS. 2 and 3, one slider supporting spring is provided at one side of the carriage 25. When two sliders 21 are to be provided to a carriage 25 as in cases of intermediate four carriages 25 illustrated in FIG. 1, two slider supporting springs 22 are set plane-symmetrically at both side of the carriage 25 fixed to the rotary shaft 23 and driven together with two sets of fine tracking actuators 24. However, in the following paragraphs, the slider supporting spring 22 is described to be set at one side of the carriage 25 to simplify the description.

The fine tracking actuator 24 consists of a driving coil 24A provided at a base part 22E of the slider supporting spring 22 and a permanent magnet 24B provided on the carriage 25 facing to the driving coil 24A. Shifting direction of the slider supporting spring 22 is controlled by changing current direction of a driving current flowing through the driving coil 24A. At backside of the permanent magnet 24B, a yoke material 25E is embedded.

With a mounting member 22B, a connecting part 22C of the slider supporting spring 22 is fixed to the rotary shaft 23 so that a gravity center of the slider supporting spring 22 coincides to a center axis 23a of the rotary shaft 23. The rotary shaft 23 is rotatably set to the bearing member 25A with a snap pin 25B.

Returning to FIG. 1, the main actuator 27 consists of the stator part 27A and the rotor part 27B to rotate the carriage rotating shaft 26 being driven by the stator part 27A.

For controlling the head-positioning mechanism 2, a head-position control circuit 30 is provided in the head-positioning system of FIG. 1.

Movement of the head-positioning mechanism 2 is generally controlled divided in two stages, that is, an accessing control for shifting the read/write head 100 onto a desired track of the disk medium 12 and a following control for controlling the read/write head 100 to correctly follow the desired track. This invention concerns the following control making use of the fine tracking actuator 24, and so, there are depicted only functional blocks concerning the following control in FIG. 1, for correcting positional errors of the read/write head relative to the following track by controlling the fine tracking actuator 24 according to deviation information calculated from positional information detected by the read/write head 100.

Referring to FIG. 1, the head-position control circuit 30 comprises a phase compensating controller 31 for calculating the deviation information relative to the following track from the positional information detected by the read/write head 100 and driving the fine tracking actuator 24 according to the deviation information, and a vibration suppressing controller 32 for controlling the main actuator 27 to output such control torque as to compensate reaction of the torque generated by the fine tracking actuator 24 driven by the phase compensating controller 31.

The head-position control circuit 30 further comprises an outside-disturbance suppressing controller 33 for suppressing outside disturbance such as an elastic force of a FPC (Flexible Printed Cable) affecting movement of the carriages 25, and a compensation signal generator 34 for generating a compensation signal to be supplied to the main actuator 27 according to outputs of the vibration suppressing controller 32 and the outside-disturbance suppressing controller 33.

Now, operation of the head-positioning system of FIG. 1 is described referring to FIGS. 1 to 3 and FIG. 4.

Figure 4:
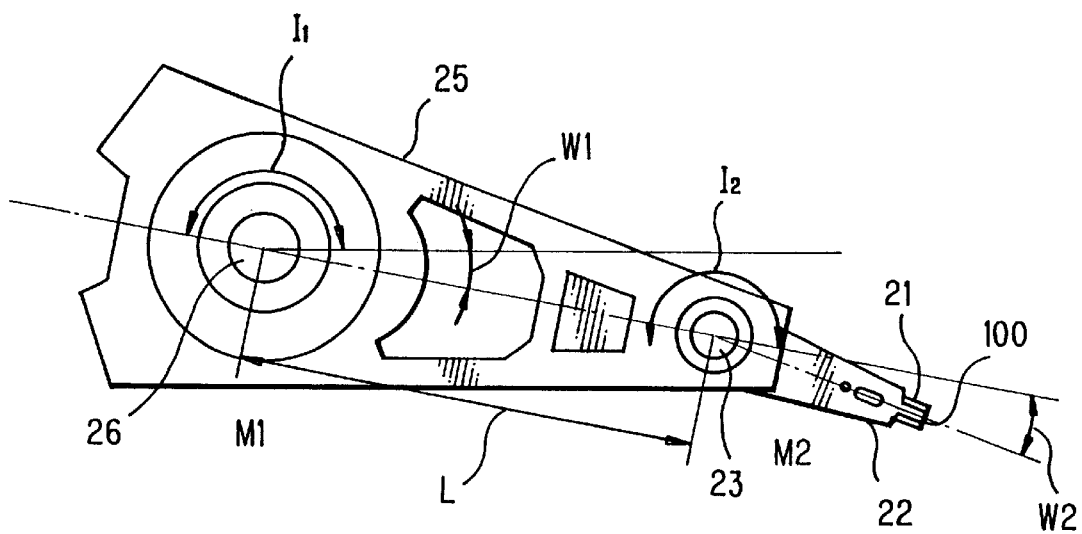
FIG. 4 is a plane view of the carriage 25 and the slider supporting spring 22 for illustrating the following control of the head-positioning system of FIG. 1.

FIG. 4 is a plane view of the carriage 25 and the slider supporting spring 22 for illustrating the following control of the head-positioning system of FIG. 1.

The carriage 25 is fixed to the carriage rotating shaft 26, and the gravity center of the carriage 25 including the slider supporting spring 22 and the slider 21 is designed to coincide to a center axis 26a of the carriage rotating shaft 26. At the top of the carriage 25, the rotary shaft 23 is set rotatably and the slider supporting spring 22 is fixed to the rotary shaft 23 whereof the center axis 23a coincides to the gravity center of the slider supporting spring 22 including the slider 21.

When head positioning is to be performed, the read/write head 100 is moved according to an access control onto a seeking track by rotating the carriage rotating shaft 26 making use of the main actuator 27 in the same way with conventional head-positioning mechanism.

In the following control, positioning of the read/write head 100 is performed only by rotating the slider supporting spring 22 relative to the carriage 25 making use of the fine tracking actuator 24, maintaining rotation angle of the carriage 25 to be fixed, as follows, in the head-positioning system of FIG. 1 according to the embodiment.

In the following control, the read/write head 100 outputs a positional error signal S12 by detecting difference between the center of the following track and the center of the read/write head 100, which is supplied to the phase compensating controller 31.

The phase compensating controller 31, which is composed of PID controllers, for example, outputs a positioning correcting signal S31 for driving the fine tracking actuator 24 so as to cancel the difference between the center of the following track and the center of the read/write head 100.

The rotating system of the fine tracking actuator 24 can be made far lighter than the rotating system of the main actuator 27 (or a single actuator of conventional head-positioning mechanism). Therefore, the controllable frequency band of the fine tracking actuator 24 can be made far wider than that of the conventional single actuator.

Figure 5A:
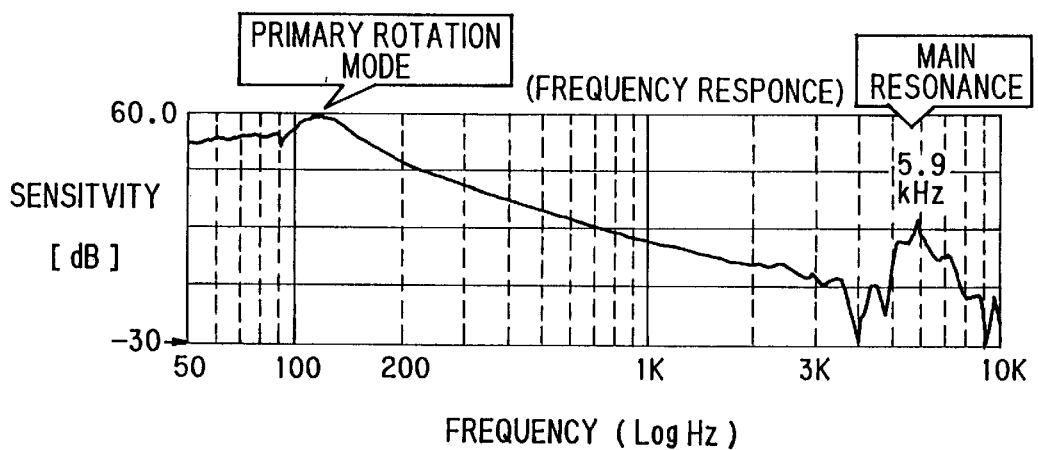
FIG. 5A is a graphic chart illustrating a frequency characteristic of a conventional single actuator.
Figure 5B:
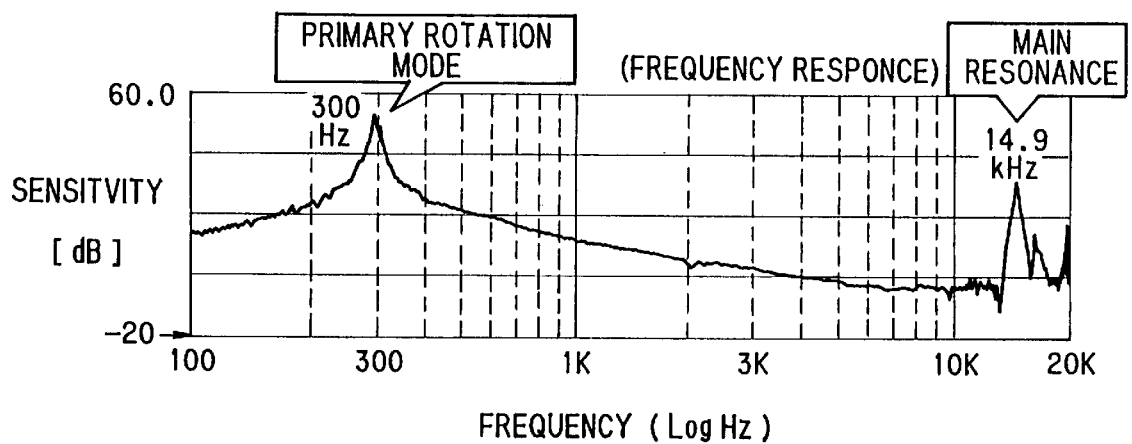
FIG. 5B is a graphic chart illustrating a frequency characteristic the fine tracking actuator 24 of FIG. 3.

FIGS. 5A and 5B are graphic charts comparing frequency characteristics of a conventional single actuator (with no fine tracking actuator) and the fine tracking actuator 24, respectively. As can be seen from the graphic charts, the mechanical resonance frequency, and consequently, the controllable frequency band of the fine tracking actuator 24 of FIG. 5B are about three times higher than those of the conventional single actuator of FIG. 5A.

However, the resonance of the rotating system (the carriages 25 and so on) of the main actuator 27 might be caused by interference of the rotating system of the fine tracking actuator 24, when the fine tracking actuator 24 is driven near the resonance frequency of the rotating system of the main actuator 27, as previously described in the prior art section.

For suppressing this interference, the vibration suppressing signal S32 is generated by the vibration suppressing controller 32 in the head-positioning system of FIG. 1.

Referring to FIG. 4, I1 and M1 denoting the inertia moment around the carriage rotating shaft 26 and the mass of the rotating system of the main actuator 27, respectively, I2 and M2 denoting the inertia moment around the rotary shaft 23 and the mass of the rotating system of the fine tracking actuator 24, respectively, T1 and W1 denoting the driving torque and the angular acceleration of the main actuator 27, respectively, T2 and W2 denoting the driving torque and the angular acceleration of the main actuator 27, respectively, and L denoting the distance between the carriage rotating shaft 26 and the rotary shaft 23, a following equations of motion stands;

$$T1=(I1+M2L+I2)W1+I2W2 \quad (1)$$

$$T2=I2(W1+W2). \quad (2)$$

To maintain the carriage 25 to be fixed without affected by the movement of the fine tacking actuator 24 means to maintain the angular acceleration W1 of the main actuator 27 to be zero for any value of the angular acceleration W2 of the fine tracking actuator.

From equations (1) and (2), a following equation stands;

$$W1=(T1-T2)/(I1+M2L). \quad (3)$$

Therefore, by forward-controlling the main actuator 27 to generate the same torque T1 with the torque T2 to be generated by the fine tracking actuator 24, the angular acceleration W1 of the main actuator 27 can be maintained to be zero, cancelling the reaction of the fine tracking actuator 24.

Thus, the vibration suppressing controller 32 generates the vibration suppressing signal S32 so as to control the main actuator 27 to generate the same torque of the fine tracking actuator driven by the positioning correcting signal S31, referring to the positioning correcting signal S31 generated by the phase compensating controller 31.

Furthermore, an outside-disturbance suppressing signal S33 is generated by the outside-disturbance suppressing controller 33 to be added to the vibration suppressing signal S32 by the compensation signal generator 34, in the embodiment of FIG. 1. The outside-disturbance suppressing controller 33 has an outside disturbance table inside thereof to be referred to with cylinder number information of the seeking track supplied from a control unit (not depicted in the drawings) of the magnetic disk device, wherein appropriate control values of the main actuator 27 are registered for each cylinder number, for example, to compensate affect of the outside disturbance such as the elastic force of the FPC connected to the head-positioning mechanism 2.

As heretofore described, a fine and high-speed tracking control of the read/write head 100 can be realized making use of the fine tracking actuator 24, accurately and stably, by providing the vibration suppressing controller 32 and the outside-disturbance suppressing controller 33, in the embodiment of the invention.

What is claimed is:

1. A head-positioning system having comprising:
    a head-positioning mechanism including:
        a slider holding a read/write head;
        a slider supporting spring for supporting the slider;
        a carriage fixed to a carriage supporting shaft for rotating the slider supporting spring which is set rotatably to the carriage;
        a fine tracking actuator for driving the slider supporting spring in a rotational direction relative to the carriage; and
        a main actuator for rotating the carriage supporting shaft around a center axis of the carriage supporting shaft; and
    a head-position control circuit performing the functions of:
        obtaining deviation information of the read/write head relative to a designated position from positional information defect by the read/write head;
        generating a positioning correcting signal for feedback-controlling the fine tracking actuator to drive the slider supporting spring with a torque value to make the read/write head follow the designated position, according to the deviation information; and
        forward-controlling the main actuator to maintain an angular position of the carriage to be fixed when the slider supporting spring is driven by the fine tracking actuator.

2. The head-positioning system as recited in claim 1, wherein the function of forward-controlling is performed by controlling the main actuator to generate the same torque value with the torque value to be generated by the fine tracking actuator, referring to the positioning correcting signal.

3. A head-positioning system as recited in claim 2; the head-position control circuit comprising:
    a phase compensating controller for obtaining the deviation information of the read/write head relative to the designated position from the positional information detected by the read/write head, and generating the positioning correcting signal for feedback-controlling the fine tracking actuator to drive the slider supporting spring with the torque value to make the read/write head follow the designated position, according to the deviation information; and
    a vibration suppressing controller for forward-controlling the main actuator to maintain the angular position of the carriage to be fixed by controlling the main actuator to generate the same torque value with the torque value to be generated by the fine tracking actuator, referring to the positioning correcting signal.

4. A head-positioning system as recited in claim 3; further comprising:

an outside-disturbance suppressing controller for generating an outside-disturbance suppressing signal to compensate affect of outside disturbance impressed to the main actuator, by referring to an outside disturbance table wherein appropriate control values of the main actuator are registered for each cylinder number of a magnetic disk medium whereto the read/write head faces; and a compensation signal generator for generating a compensation signal to be supplied to the main actuator by integrating outputs of the vibration suppressing controller and the outside-disturbance suppressing controller.

* * * * *